US007253537B2

(12) United States Patent
Weng et al.

(10) Patent No.: US 7,253,537 B2
(45) Date of Patent: Aug. 7, 2007

(54) SYSTEM AND METHOD OF OPERATING DOUBLE FED INDUCTION GENERATORS

(75) Inventors: Haiqing Weng, Shanghai (CN); Robert William Delmerico, Clifton Park, NY (US); Xiaoming Yuan, Shanghai (CN); Changyong Wang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 54 days.

(21) Appl. No.: 11/297,775

(22) Filed: Dec. 8, 2005

(65) Prior Publication Data

US 2007/0132248 A1 Jun. 14, 2007

(51) Int. Cl.
*H02P 9/48* (2006.01)

(52) U.S. Cl. .......................................... 290/44; 322/37
(58) Field of Classification Search .................. 290/7, 290/1 A, 6, 43, 44; 32/28, 37
See application file for complete search history.

(56) References Cited

U.S. PATENT DOCUMENTS

| 6,163,137 | A  | * | 12/2000 | Wallace et al. | ............... | 322/20 |
| 6,566,764 | B2 | * | 5/2003  | Rebsdorf et al. | ............. | 290/44 |
| 6,806,688 | B2 | * | 10/2004 | Noro et al. | ..................... | 322/20 |
| 6,853,094 | B2 | * | 2/2005  | Feddersen et al. | ............ | 290/44 |
| 7,038,329 | B1 | * | 5/2006  | Fredette et al. | ........... | 290/40 C |
| 7,071,579 | B2 | * | 7/2006  | Erdman et al. | ................ | 290/55 |
| 7,102,247 | B2 | * | 9/2006  | Feddersen | ..................... | 290/44 |

FOREIGN PATENT DOCUMENTS

| EP | 1499009 A1 | 1/2005 |
| WO | WO2004/040748 A1 | 5/2004 |

OTHER PUBLICATIONS

Andreas Petersson "Analysis, Modeling and Control of Doubly—Fed Induction Generators for Wind Turbines", Thesis for the Degree of Doctor of Philosophy, Chalmers University of Technology, Goteborg, Sweden 2005 Chapter 7—pp. 89-132.
Prof. Goran Strbac and Dr. Frank Allison "A New Controller for DFIG Based Wind Farms", The University of Manchester Intellectual Property Limited 1824 Pages—2 Available online at http://www.umip.com/pdfs/DFIG%20wind%20farms.pdf.

* cited by examiner

*Primary Examiner*—Nicholas Ponomarenko
(74) *Attorney, Agent, or Firm*—Ann M. Agosti; Patrick K. Patnode

(57) ABSTRACT

A protection system and a protection method are provided for protecting a double fed induction generator and a gearbox during a grid fault. The protection system includes a plurality of controlled impedance devices. Each of the controlled impedance devices is coupled between a respective phase of a stator winding of the double fed induction generator and a respective phase of a grid side converter. The protection system also includes a controller configured for coupling and decoupling impedance in one or more of the plurality of controlled impedance devices in response to changes in at least one of a utility grid voltage and a utility grid current.

23 Claims, 4 Drawing Sheets

SYSTEM AND METHOD OF OPERATING DOUBLE FED INDUCTION GENERATORS

BACKGROUND

The present invention relates generally to the field of double fed induction generators. In particular, the present invention relates to control and protection of double fed induction generators during grid faults.

Double fed induction generators (DFIGs) are used in a wide range of applications because of their efficiency and reliability. Generally, DFIGs are used in variable speed generation (VSG) systems for generating electric energy from intermittent or variable energy resources such as wind farms. The main advantage of a variable speed generation system over a fixed speed system is the possibility of electronically controlling the shaft speed in order to maintain maximum efficiency of the energy conversion process. For example, a wind turbine generator typically uses a DFIG comprising an AC/DC converter coupled to a DC/AC converter for wind power generation. The DFIG technology enables maximum energy to be extracted from the wind for low wind speeds by optimizing the turbine speed, while minimizing mechanical stresses on the turbine during gusts of wind and grid transients. Another advantage of the DFIG technology is the ability for power electronic converters to generate or absorb reactive power, thus reducing the need for installing capacitor banks.

DFIG controller design considerations have generally concentrated on providing an adjustable operating speed to maximize turbine power output, maintaining the required generator terminal voltage or power factor, and controlling the generator torque to match that of the wind turbine. However, little or no attempt has been made to provide the capability of contributing to stability of power network operation. The increasingly widespread use of wind power generation requires the wind-farms to contribute to the stability of power network operation.

Wind turbines with double fed induction generators are sensitive to grid faults. A grid fault will give rise to severe transients in the air-gap torque and shaft torque and may therefore impact system reliability. For example, when grid voltage drops below a threshold value due to a grid fault, the air-gap torque also drops, thereby leading to an oscillation in the gearbox and drive shaft that may reduce gearbox life. Grid recovery sequences also result in severe transient conditions in double fed induction generators. A conventional technique to avoid damage in the DFIG and the gearbox includes disconnecting the wind turbine generators from the grid when large voltage sags appear in the grid due to grid fault. After a period of time, the turbine is then reconnected to the grid. However, new grid codes now require wind turbines and wind farms to ride through voltage sags, meaning that normal power production should be immediately re-established once the nominal grid voltage has recovered.

Different techniques have been proposed to modify the DFIG system so as to achieve above requirement. For example, anti-parallel thyristors may be used in the stator circuit to achieve a quick (within 10 milliseconds, for example) disconnection of the stator circuit, and also provide the capability to remagnetize the generator and reconnect the stator to the grid as fast as possible. Another option proposed is to use a static switch in the rotor circuit, which can break the short circuit current in the rotor. A third method is to use a DVR (Dynamic Voltage Restorer) that can isolate the DFIG system from voltage sags. However, the first two options are not effective in reducing shaft stress, and the third option is expensive.

It is therefore desirable to provide a control and protection technique that enables a DFIG to efficiently contribute to power network operation and reduce the shaft stress during grid faults.

BRIEF DESCRIPTION

Briefly in accordance with one aspect of the present invention, a protection system is provided. The protection system includes a plurality of controlled impedance devices. Each of the controlled impedance devices is coupled between a respective phase of a stator winding of a double fed induction generator and a respective phase of a grid side converter. The protection system also includes a controller configured for coupling and decoupling impedance in one or more of the plurality of controlled impedance devices in response to changes in at least one of a utility grid voltage and a utility grid current.

In accordance with another aspect of the present invention, a wind turbine generator is provided. The wind turbine generator includes a wind turbine coupled to a double fed induction generator and a plurality of controlled impedance devices. Each of the controlled impedance devices is coupled between a respective phase of a stator winding of the double fed induction generator and a respective phase of a grid side converter. The wind turbine generator also includes a controller configured for coupling and decoupling impedance in one or more of the plurality of controlled impedance devices in response to changes in at least one of a utility grid voltage and a utility grid current.

In accordance with a further aspect of the present invention, a protection method is provided. The protection method provides for coupling and decoupling impedance in one or more of a plurality of controlled impedance devices in response to changes in at least one of a utility grid voltage and a utility grid current. Each of the controlled impedance devices is coupled between a respective phase of a stator winding of a double fed induction generator and a respective phase of a grid side converter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention are generally directed to control and protection of double fed induction generators (DFIGs) and gearboxes during grid faults. Such embodiments may be used in a variety of applications, such as for wind power generation, variable speed hydraulic generation and so forth. Though the present discussion provides examples in a wind power generation context, one of ordinary skill in the art will readily apprehend that the application of these embodiments in other contexts is well within the scope of the present invention.

Figure 1:
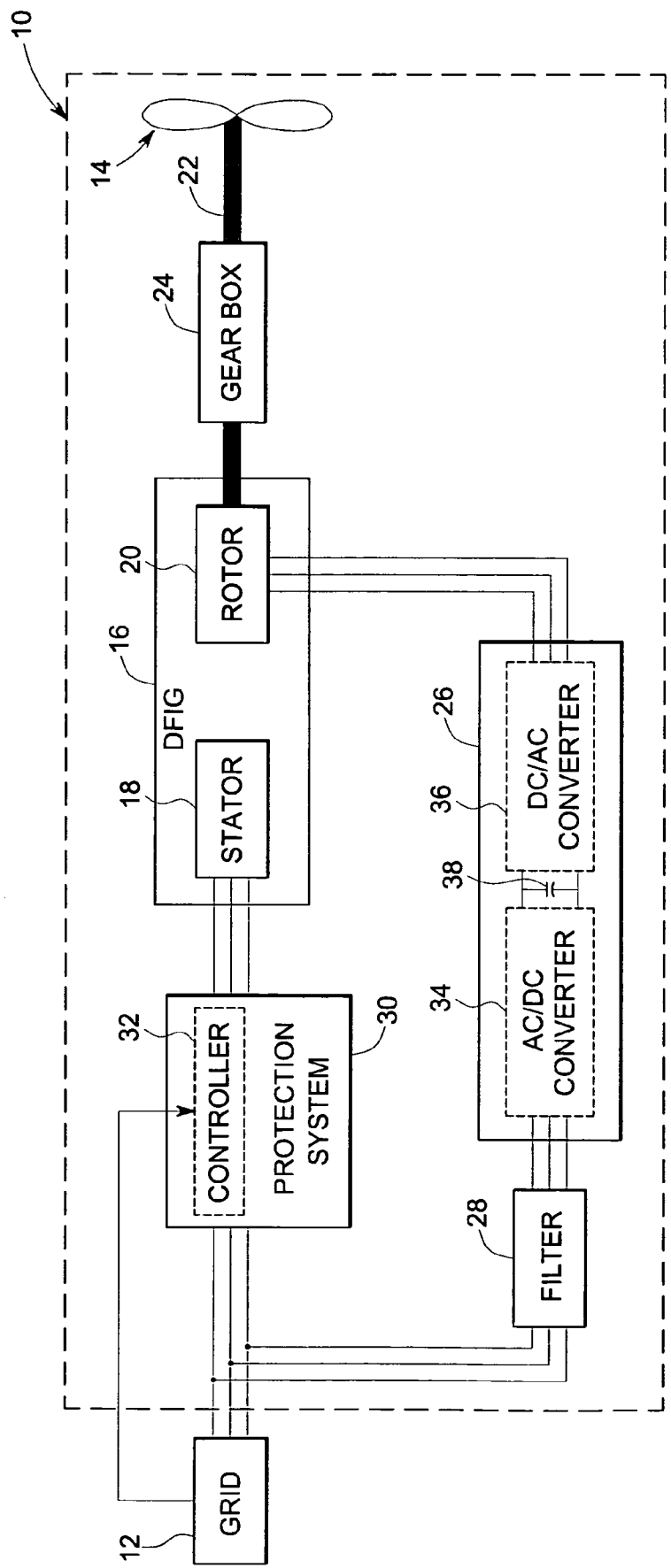
FIG. 1 depicts a block diagram of an exemplary wind turbine generator in accordance with aspects of the present invention.

Referring now to FIG. 1, a block diagram of an exemplary wind turbine generator 10 is illustrated in accordance with aspects of the present invention. In the illustrated embodiment, the wind turbine generator 10 is coupled to a utility grid 12 for electrical power distribution and includes a wind turbine 14 coupled to a DFIG 16. The DFIG 16 comprises a stator 18 and a rotor 20. The rotor 20 is mechanically coupled to the wind turbine shaft 22 via a gearbox 24. The stator windings of the DFIG 16 are coupled to the utility grid 12 via a protection system 30, and the rotor windings of the DFIG 16 are coupled to the utility grid 12 via a back-to-back converter 26 and an electrical filter 28. The protection system 30 is provided between the stator 18 and the grid side of the back-to-back converter 26 in accordance with aspects of the present invention for protecting the DFIG 16 and the gearbox 24 during transient conditions. The protection system 30 may include a controller 32 for controlling the protection system 30 based on the changes in at least one of grid voltage and grid current.

The back-to-back converter 26 further includes a grid side AC-DC converter (rectifier) 34 and a machine side DC-AC converter (inverter) 36 that are coupled to each other in a back-to-back configuration. Between the two converters 34 and 36 a DC link capacitor 38 may be provided as an energy storage device for keeping the voltage variation (ripples) in the DC link voltage small. As will be appreciated by one skilled in the art, the grid-side converter 34 provides a constant DC-link voltage while the machine-side converter 36 enables the control of the torque or the speed of the DFIG 16 and also the power factor at the stator terminals. The electrical filter 28 prevents or reduces harmonics generated by the back-to-back converter 26 from being injected into the utility grid 12.

Figure 2:
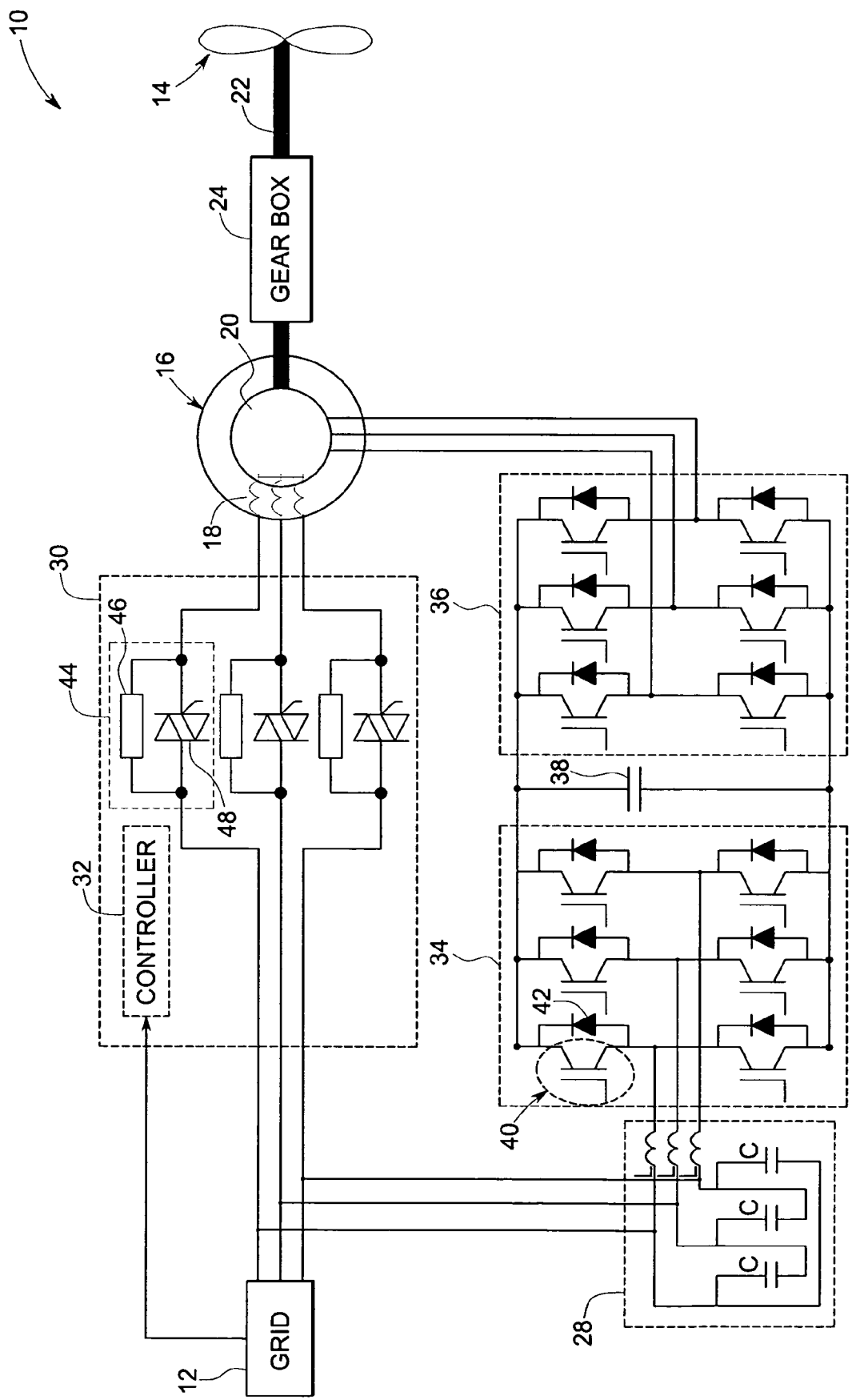
FIG. 2 is a somewhat more detailed representation of the wind turbine generator of FIG. 1 in accordance with one aspect of the present invention.

The wind turbine generator 10 is illustrated in greater detail in FIG. 2. The electrical filter 28 may comprise an AC filter and more specifically may comprise an LC filter coupled to the utility grid 12 and tuned for preventing or reducing harmonics generated by the back-to-back converter 26 from being injected into the utility grid 12. Further, each of the converters 34 and 36 includes six power switching devices 40 connected in a bridge configuration. Each of the power switching devices 40 may be provided with a freewheeling diode 42. Switching devices 40 may be gate controllable active switches such as GTOs, BJTs, IGBTs, or any other gate controllable active switches. A converter controller (not shown) may be provided to control the operation of each of the gate controllable active switches 40. In one embodiment, the controller controls current on the rotor windings so that desired values of active and reactive power delivered by the generator stator windings may be obtained. If desired, the converter controller and the protection system controller 32 may be integrated into a single control unit.

The protection system 30 comprises a controlled impedance device 44 coupled between each phase of the stator winding of the double fed induction generator 16 and a corresponding phase of the grid side converter 34. Each of the controlled impedance devices 44 includes an impedance device 46. In some embodiments the impedance device 46 is positioned in parallel with a semiconductor device 48. The semiconductor device 48 is configured to couple or decouple the impedance device 46 from each phase in response to changes in at least one of measured voltage and measured current of the utility grid 12 based on control signals received from the controller 32. The semiconductor device 48 may be a bidirectional semiconductor device such as a triac, an assembly of thyristors, or anti-parallel thyristors. During normal operation, the semiconductor device 48 is ON and hence offers a very low resistance to the stator current in comparison to the resistance offered by the impedance device 46. Each phase of the stator winding is therefore connected to the utility grid 12 via the semiconductor device 48 while the impedance device 46 is bypassed. However, during grid faults, the semiconductor device 48 is switched OFF and hence offers a very high resistance to the stator current in comparison to the resistance offered by the impedance device 46. Each phase of the stator winding is therefore connected to the utility grid 12 via the impedance device 46 while the semiconductor device 48 is OFF. The stator current therefore flows via the impedance device 46, which is coupled in the circuit during grid faults.

The controller 32 may monitor at least one of grid voltage and grid current via one or more sensors (not shown). When the grid voltage drops below a certain first threshold value (0.6 per unit, for example), or the grid current rises above a certain first threshold value, the circuit will switch to low-voltage mode of operation, and the controller 32 will switch off the semiconductor device 48 to couple the impedance device 46 in one or more phase. The switched impedance device 46 between one or more phases of the stator winding and the grid side converter 34 increases the stator voltage. Thus, the air-gap torque of the double fed induction generator 16 can be controlled to a desired value during the grid fault and the transient caused by grid recovery is reduced. The stator current may therefore be regulated so that the air-gap torque follows torque command. In the low-voltage mode of operation, the stator voltage may be regulated in phase with grid voltage to provide unity power factor, or may be regulated to provide reactive power to the grid. Further, when the grid voltage rises above a certain second threshold value (0.65 per unit, for example), or the grid current drops below a certain second threshold value, the controller 32 will switch on the semiconductor device 48 to decouple the impedance device 46 in one or more phases, and return to normal mode of operation. It should be noted that, in certain embodiments, the first and the second threshold value may be same. Further, it should be noted that, the first and the second threshold value may be predetermined or may be decided dynamically. In certain embodiments, the impedance device 46 may be properly designed and predetermined to have a fixed impedance value, so that the air-gap torque may be maintained when the grid voltage is between zero and the threshold, while limiting the stator over-current. Alternatively, a variable impedance device may be employed so that the impedance device 46 is varied during operation based upon the transient conditions.

Figure 3:
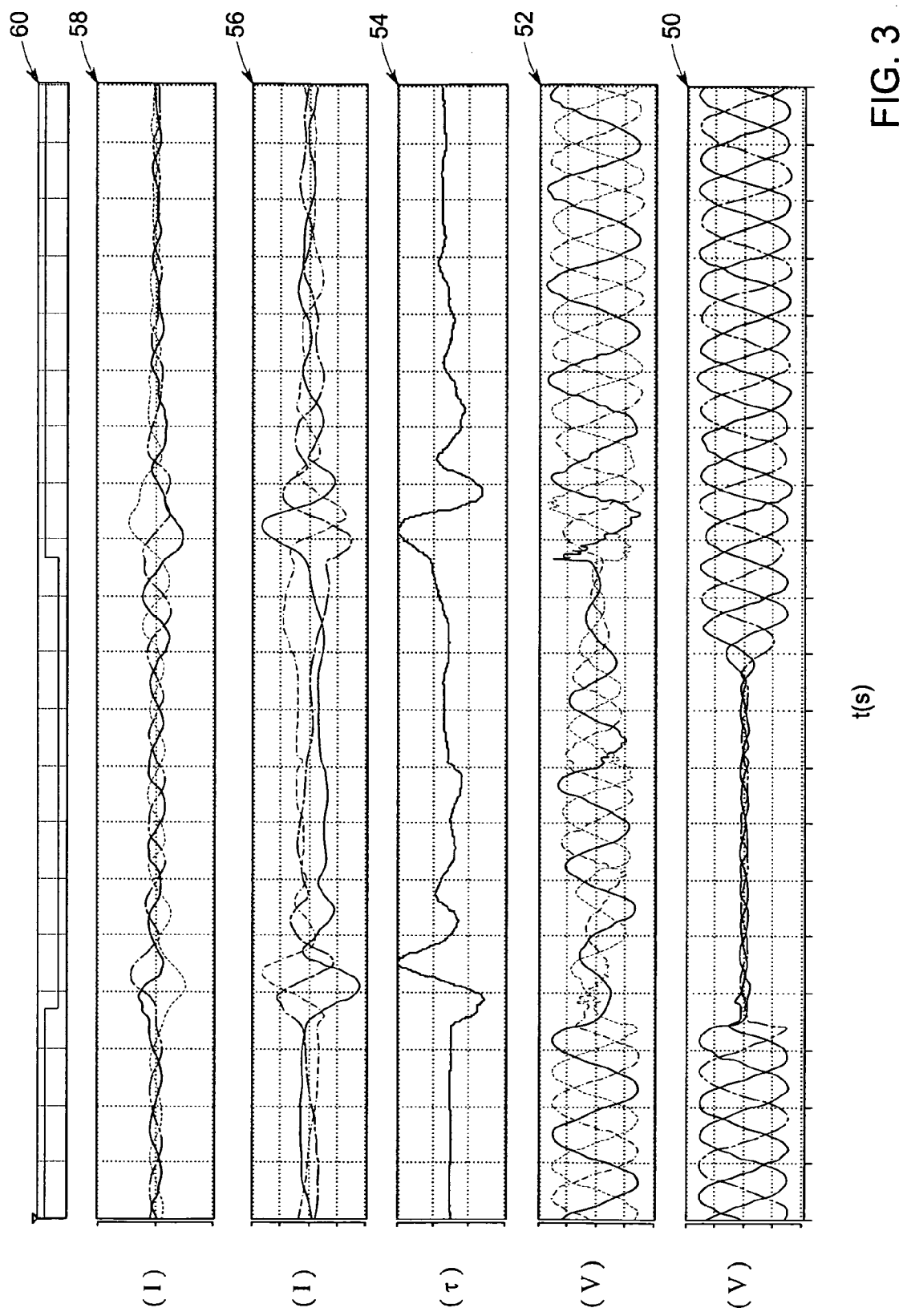
FIG. 3 is a graphical representation of stator voltage, stator current, rotor current, and air-gap torque waveforms along with grid voltage and thyristor trigger signal waveforms in the wind turbine generator of FIG. 2.

FIG. 3 depicts a simulation of grid voltage waveforms 50, stator voltage waveform 52, air-gap torque waveform 54, rotor current waveform 56, stator current waveform 58, and the trigger signal 60 for the semiconductor device for the wind turbine generator of FIG. 2 in accordance with aspects of the present invention. As illustrated in the simulation, when a grid fault occurs (i.e., when the grid voltage drops below a threshold value as depicted by a voltage sag), the controller 32 switches OFF the semiconductor device 48 via the trigger signal. The impedance device 46 is therefore coupled into the circuit to protect the DFIG 16, the gearbox 24, and the wind turbine 14 from transients. As depicted in the graph, the stator voltage 52 increases and is in phase with the grid voltage during the transient. The air-gap torque is controlled to be within a normal value. Further, the stator and rotor current is controlled to be within a normal value. When the grid voltage returns to normal value, the controller 32 switches ON the semiconductor device 48 via the trigger signal. The impedance is therefore decoupled from the circuit and normal operation is resumed.

Figure 4:
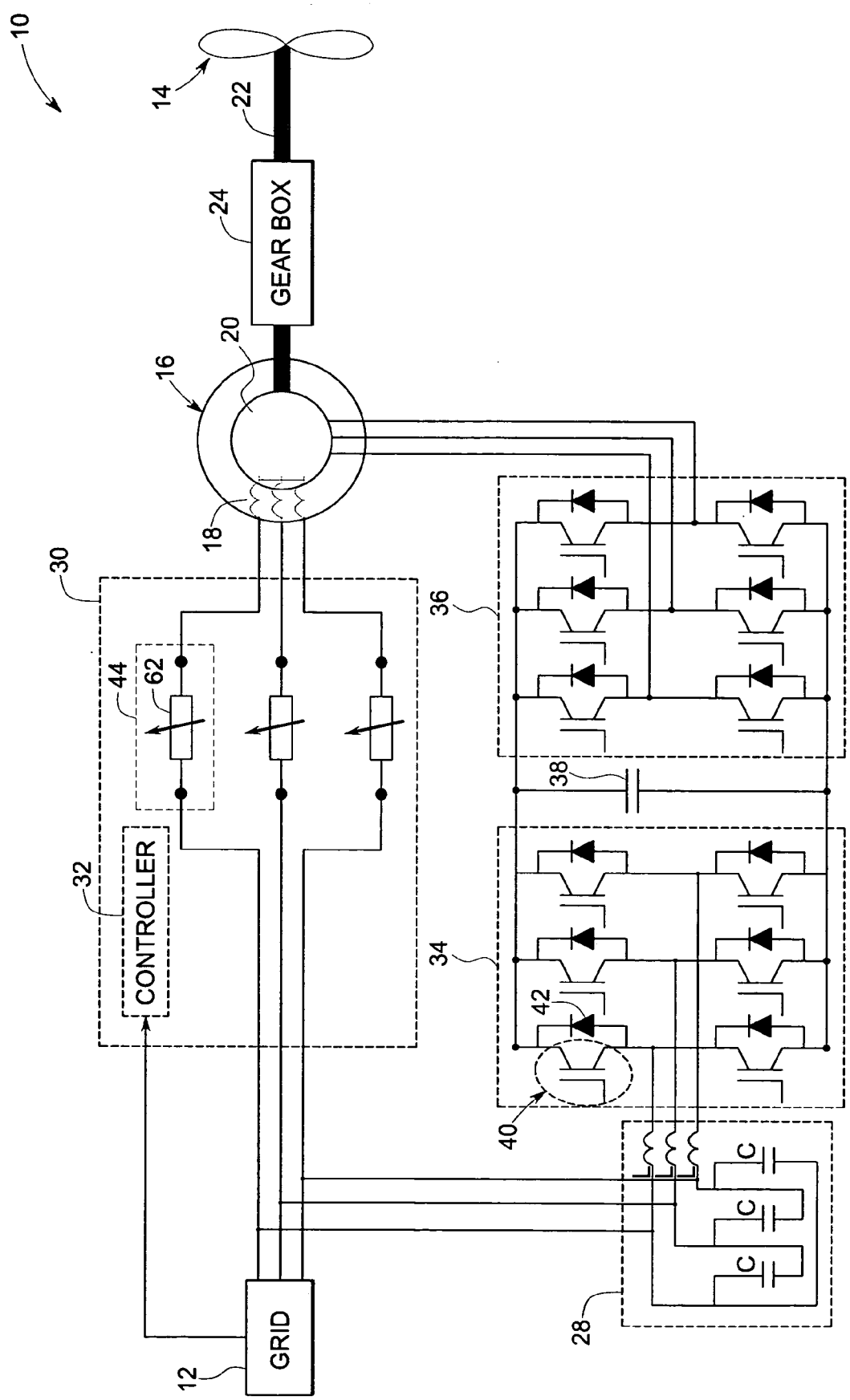
FIG. 4 is a somewhat more detailed representation of the wind turbine generator of FIG. 1 in accordance with another aspect of the present invention.

It should be noted that, in certain embodiments, the controlled impedance device 44 may include a current dependent variable impedance device 62, such as a variable resistor, PTC thermistor and so forth, as illustrated in FIG. 4. As will be appreciated by one skilled in the art, a variable impedance device is a device with a significant non-linear current-voltage characteristic and is used to protect circuits against excessive transient currents. As illustrated, the current dependent variable impedance device 62 may be coupled between each phase of the stator winding of the double fed induction generator 16 and a corresponding phase of the grid side converter 34. The variable impedance device 62 is configured to offer varying impedances depending on the stator current. This current is regulated via the controller 32 in response to changes in at least one of the voltage and the current of the utility grid 12. The variable impedance device 62 offers very low impedance when the flowing stator current is below a threshold or a rated current (corresponding to normal operation). However, the variable impedance device 62 offers higher impedance when the flowing stator current is above a threshold or above rated current (corresponding to low grid voltage condition during grid faults). Thus, the variable impedance device 62 functions by automatically coupling and decoupling impedance based on the flowing stator current.

The control and protection embodiments discussed above provide contribution to network operation and stability under large and small disturbances (transient conditions). The impedance limits the air gap torque to normal values, limits the stator and rotor over-current, and reduces the oscillation in gearbox during grid faults. In one embodiment, the stator over-current may be limited to 1.6 per unit, for example, when regulating the air-gap torque to nominal. Additionally, the impedance reduces the transient caused by grid recovery. As will be appreciated by one skilled in the art, the technique described in the various embodiments discussed above may also be applied in variable speed hydraulic generator.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A protection system, comprising:
    a plurality of controlled impedance devices, each coupled between a respective phase of a stator winding of a double fed induction generator and a respective phase of a grid side converter; and
    a controller configured for coupling and decoupling impedance in one or more of the plurality of controlled impedance devices in response to changes in at least one of a utility grid voltage and a utility grid current.

2. The protection system of claim 1, wherein each controlled impedance device comprises an impedance device in parallel with a semiconductor device, the semiconductor device being configured for coupling and decoupling the impedance device based on control signals received from the controller.

3. The protection system of claim 2, wherein the semiconductor device comprises a bidirectional semiconductor device.

4. The protection system of claim 2, wherein the semiconductor device comprises a triac, an assembly of thyristors, or anti parallel thyristors.

5. The protection system of claim 2, wherein the impedance device comprises impedance of a predetermined magnitude.

6. The protection system of claim 1, wherein each controlled impedance device comprises a current dependent variable impedance device.

7. The protection system of claim 1, wherein the controller is configured for coupling the impedance in one or more of the plurality of controlled impedance devices when the utility grid voltage drops below or the utility grid current rises above a first threshold value.

8. The protection system of claim 7, wherein the impedance increases the stator voltage when coupled.

9. The protection system of claim 7, wherein the controller is configured to control the stator voltage in phase with the utility grid voltage to provide unity power factor or to control the stator voltage to provide reactive power to a utility grid.

10. The protection system of claim 1, wherein the controller is configured for decoupling the impedance in one or more of the plurality of controlled impedance devices when the utility grid voltage rises above or the utility grid current drops below a second threshold value.

11. The protection system of claim 1, wherein the controlled impedance device further comprises an impedance device in parallel with a semiconductor device, the semiconductor device being configured for coupling the impedance device when the utility grid voltage drops below or the utility grid current rises above a first threshold value and decoupling the impedance device when the utility grid voltage rises above or the utility grid current drops below a second threshold value based on control signals received from the controller.

12. The protection system of claim 1, wherein each controlled impedance device comprises a current dependent variable impedance device, the current dependent variable impedance device configured for offering high impedance when stator current rises above a first threshold value and a very low impedance when stator current drops below a second threshold value.

13. A wind turbine generator, comprising:
    a wind turbine coupled to a double fed induction generator;
    a plurality of controlled impedance devices, each coupled between a respective phase of a stator winding of the double fed induction generator and a respective phase of a grid side converter; and
    a controller configured for coupling and decoupling impedance in one or more of the plurality of controlled impedance devices in response to changes in at least one of a utility grid voltage and a utility grid current.

14. The wind turbine generator of claim 13, wherein the wind turbine is coupled to the double fed induction generator via a gearbox.

15. The wind turbine generator of claim 13, wherein each controlled impedance device comprises an impedance device in parallel with a semiconductor device, the semiconductor device being configured for coupling and decoupling the impedance device based on control signals received from the controller.

16. The wind turbine generator of claim 13, wherein each controlled impedance device comprises a current dependent variable impedance device.

17. The wind turbine generator of claim 13, wherein the controller is configured for coupling the impedance in one or more of the plurality of controlled impedance devices when the utility grid voltage drops below or the utility grid current rises above a first threshold value.

18. The wind turbine generator of claim 13, wherein the controller is configured for decoupling the impedance in one or more of the plurality of controlled impedance devices when the utility grid voltage rises above or the utility grid current drops below a second threshold value.

19. A protection method, comprising:
coupling and decoupling impedance in one or more of a plurality of controlled impedance devices in response to changes in at least one of a utility grid voltage and a utility grid current, wherein each of the plurality of controlled impedance devices is coupled between a respective phase of a stator winding of a double fed induction generator and a respective phase of a grid side converter.

20. The method of claim 19, wherein coupling and decoupling the impedance comprises coupling and decoupling an impedance device via a semiconductor device based on control signals received from a controller, the semiconductor device being connected in parallel with the impedance device in each of the plurality of controlled impedance devices.

21. The method of claim 19, wherein coupling and decoupling the impedance comprises coupling and decoupling the impedance in a current dependent variable impedance device based on control signals received from a controller.

22. The method of claim 19, wherein coupling the impedance comprises coupling the impedance when the utility grid voltage drops below or the utility grid current rises above a first threshold value.

23. The method of claim 19, wherein decoupling the impedance comprises decoupling the impedance when the utility grid voltage rises above or the utility grid current drops below a second threshold value.

* * * * *